United States Patent Office 2,875,062
Patented Feb. 24, 1959

2,875,062

PRECIPITATION OF TANNINS AND/OR PROTEINACEOUS SUBSTANCES FROM LIQUID MEDIA

Jesse Werner, Holliswood, N. Y., assignor to General Aniline & Film Corporation, New York, N. Y., a corporation of Delaware No Drawing. Application October 31, 1957
Serial No. 693,529

6 Claims. (Cl. 99—48)

The present invention relates to an improved method of removing tannins and/or protein-tannin complexes from liquid media containing the same.

The substantial removal or elimination of tannins and/or protein-tannin complexes from liquid mediums containing the same is highly desirable in order to effect improvement in taste, clarity, purity, stability and the like. In the food, beverage and drug industries, it is necessary to remove natural tannin substances such as tannic acids and tannins, and protein-tannin complexes. For instance, in the preparation of beer from extracts of barley and hops, wine from pressed grapes, brandy, whiskey, fruit juices, tea or coffee, sugar cane extracts, etc. it is necessary to remove tannins or tannic acid.

As the art is now practiced, tannins are precipitated from various liquid mediums containing the same by the addition of various coagulating and precipitating agents, such as for example, ferric hydroxide, lead acetate, gelatin, caffeine, casein, skimmed milk, activated charcoal and the like.

In a majority of cases, while employing such coagulating and precipitating agents, the residue of the precipitant or of the tannin or tannic acid remains in the solution either from the necessity of using an excess of the precipitant or coagulant, from metathesis incidental to precipitation, or from incomplete precipitation. The residue thus remaining is undesirable and even injurious, thus rendering these methods of precipitation unsuitable for many purposes.

I have discovered that natural tannin substances, i. e. tannic acid and tannins and/or protein-tannin complexes, are substantially and in a majority of cases, quantitatively precipitated from liquid media, especially aqueous and alcoholic solutions containing them, by the addition of a coagulating or precipitating amount of a polyvinylimidazole having the following general formula:

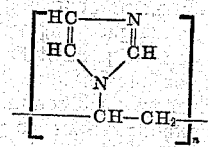

wherein $n$ represents the extent of polymerization as indicated by the molecular weight which may range from 20,000 to 400,000.

The polyvinylimidazole characterized by the foregoing general formula possesses sufficient water, alcohol and alcohol-water solubility to effect either the precipitation or coagulation of natural tannins and/or protein-tannin complexes provided however, that the molecular weight be within the aforestated range.

The polyvinylimidazole utilized in accordance with the present invention is a commercially available product and may be purchased on the open market in various grades of molecular weight range. The polymer is readily obtained by polymerizing the monomer by heating with peroxide catalyst in the presence of ultraviolet light. The monomer may also be polymerized in water solution or in methanol solution to yield a water soluble polymer.

Natural tannin substances such as tannic acids and tannins are readily precipitated from alcohol, alcohol-water and aqueous solutions containing them by the addition of a precipitating amount of the polyvinylimidazoles. For practical purposes I have found that not only are the tannins and tannic acid substantially and completely precipitated, but the polyvinylimidazole is likewise substantially and completely precipitated when added in this ratio of 2 to 3.5 times the weight of the natural tannin substances present in said solutions. Thus, the stoichiometric relation of the polyvinylimidazole to tannic acid or tannin in the precipitate remains constant regardless of the presence of an excess of either the tannin substance or the precipitant in the combination. The precipitation of tannic acid from aqueous alcohol or water-alcohol solutions containing them by the use of the polyvinylimidazoles was found to be substantially quantitative, i. e. 99 to 100%. After the precipitation of the natural tannin substances the precipitate can be removed from the liquid medium by centrifuging, filtering, settling or decanting to yield a clear solution. In the case where clarification of the solution is not necessary and it is merely desired to remove the natural tannin substances, the precipitate can be allowed to remain in the fluid mixture.

The precipitation or coagulation of protein-tannin complexes contained in various liquid mediums containing the same can be very readily determined by simple spot experiments. Each liquid medium may require an amount which may be more or less than another liquid medium. In other words, the finding of exact amounts of the polyvinylimidazole will have to be determined by using minimum and maximum amounts for each fluid whereby the exact amount will be indicated in the particular operation.

The polyvinylimidazole is used to advantage in the removal of tannin substances and protein-tannin complexes from beer, wine, coffee, tea, fruit juices, vinegar, etc., not only to improve their quality especially at low temperatures but also to remove undesirable tastes and odors. It may be employed to advantage in clarifying various industrial solutions and in the preparation of pharmaceutical extracts from materials containing tannins, tannic acid and various complexes of proteins with tannin.

The following examples which are merely illustrative will show how the process of the present invention is to be practiced.

Example I

A 5% solution of polyvinylimidazole having a molecular weight of 160,000 is first prepared in distilled water. To 100 cc. of grape juice there was added 0.8 cc. of the polyvinylimidazole solution (containing 0.04 grams of the polymer) and 7.2 cc. of distilled water. The solution was thoroughly stirred and then placed in a refrigerator for 20 hours. After allowing to warm to room temperature, the solution was filtered and an 8 cc. aliquot removed. This was then added to a tared 4" test tube and centrifuged for ½ hour. The liquid was decanted and the test tube dried in a vacuum at 60° C. for 20 hours. The weight of the precipitate was found to be 0.0244 gram. The quality of the aliquot portion compared to the untreated grape juice was most remarkable in that it was of a clear wine color whereas the grape juice untreated with polyvinylimidazole was a murky purple color.

Example II

Example I was repeated with the exception that 0.8 cc. of the aqueous polyvinylimidazole solution was replaced by 2 cc. of the same solution and 7 cc. of water added instead of 7.2 cc. The treated sample was worked as in Example I. The weight of the precipitate obtained was 0.0486 gram. The quality of the treated sample, after centrifuging, was of a clear wine color whereas the control, i. e. untreated sample was of a murky purple.

From the foregoing examples it becomes clearly manifest that amounts as little as 0.04 to 0.10 part by weight of the polyvinylimidazole per 100 parts of beer, wine, tea, fruit juices, etc. is sufficient to precipitate the tannic acid in substantial quantity, impart clarity and greatly improve the color and brightness.

*Example III*

To 100 cc. of dry sherry wine there was added 2 cc. of aqueous polyvinylimidazole solution (containing 5% by weight of the polymer) having a molecular weight of 160,000 and mixed thoroughly. A substantial white, curdy precipitate was formed immediately. Upon settling, a clear supernatant liquid remained which was much lighter in color than the original sample of wine.

*Example IV*

To 100 cc. of bourbon (unchilled Schenley, Ancient Age) there was added 2 cc. of an aqueous 5% by weight solution of polyvinylimidazole having a molecular weight of 160,000 and mixed thoroughly. Upon standing, the whiskey turned cloudy. After centrifuging, a small white precipitate settled out and the clear supernatant liquid was much lighter in color than the untreated whiskey.

*Example V*

To 50 ml. of freshly filtered beer, which had not been enzyme treated and which had not been pasteurized, contained in a 4 oz. glass vial, there was added 1 ml. of a 2% aqueous solution of polyvinylimidazole having a molecular weight of 160,000. The precipitate formed in the mixture was allowed to stand for 48 hours at room temperature. After 12 hours, the precipitate had settled to the bottom of the glass vial and the supernatant liquid was clear after 48 hours. The material was filtered through a No. 5 Whatman filter paper. The filtrate was a clear amber liquid.

The sample of the same beer prior to the addition of the polyvinylimidazole, was filtered through a No. 5 Whatman filter paper and used as a control.

The two filtered beers were cooled for 20 minutes in a mixture of crushed ice and water. The untreated beer developed a definite haze on cooling, whereas the treated beer remained clear.

The light transmittancy was determined on the two samples using a Fisher electrophotometer. The control beer (untreated) showed a light transmittancy of 78.7% whereas the treated beer showed a light transmittancy of 99%.

It is to be noted that the precipitation of natural tannin substances occurs by the addition of polyvinylimidazole in larger amounts up to 3.5 times the quantity of the natural tannin substance present. Thus when an excess of the polyvinylimidazole is not objectionable in the residual liquid medium, amounts from 2.5 to 3.5 parts of the polyvinylimidazole per part by weight of natural tannin substances can be added to such solutions or liquid mediums to effect complete precipitation of the natural tannin substances. Moreover, when it is necessary to reduce but not to eliminate the natural tannin substances from aqueous or other liquid media, the proportion of the natural tannin substances can be readily regulated by adding an amount of the polyvinylimidazole corresponding to the aforesaid proportion of 2–2.5 times the weight of the natural tannin substance present.

If on the other hand clear solutions are desired, the polyvinylimidazole-natural tannin substance precipitated can be removed by filtration, centrifuging, decanting or with suitable filter media or clarifying aids such as silica, aluminum hydroxide gel, fuller's earth and the like. Generally however, filtering substances of this type are not required to cause the process of the present invention to operate in a satisfactory manner. In cases where the precipitate is not objectionable such as in rubber latex dispersions, the precipitate can be allowed to remain in the fluid mixture.

The temperatures employed in precipitating or coagulating the tannins and/or protein-tannin complexes should not exceed 30–35° C. In lieu of room temperatures and slightly above, temperatures as low as the freezing point of the liquid medium, so long as the liquid medium remains liquid, may be used. Although not critical the pH value of the liquid medium whether aqueous, alcohol or alcohol-water should not substantially exceed the limits of 5 to 7.

As observed from the foregoing discussion and from the illustrative working examples, it becomes clearly manifest that the concentration of the polyvinylimidazoles described herein is not critical. Fairly concentrated solutions of the polyvinylimidazole may be employed so long as their viscosity does not interfere with their handling. Relatively concentrated solutions are preferred in order to minimize dilution of the solution containing tannin, tannic acid, or protein-tannin complex. Concentrations from 10 to 20% by weight of the polyvinylimidazole in the added solution are advantageous to attain the desirable features of the present invention.

I claim:

1. The process of precipitating substances selected from the group consisting of natural tannins and protein-tannin complexes from liquid media containing the same which comprises adding to the said liquid media, in a precipitating amount, a polyvinylimidazole having a molecular weight of 20,000 to 400,000 and removing the precipitate from the liquid media.

2. The process of precipitating natural tannin substances from an aqueous solution containing the same which comprises adding to said solution, in a precipitating amount, a polyvinylimidazole having a molecular weight ranging from 20,000 to 400,000 and removing the precipitate from the aqueous solution.

3. The process for precipitation of natural tannin substances from fruit juices which comprises adding to said fruit juice, in a precipitating amount, a polyvinylimidazole having a molecular weight ranging from 20,000 to 400,000 and removing the precipitate from the fruit juice.

4. The process for precipitation of natural tannin substances from wine which comprises adding to said wine, in a precipitating amount, a polyvinylimidazole having a molecular weight ranging from 20,000 to 400,000 and removing the precipitate from the wine.

5. The process for precipitation of natural tannin substances from whiskey which comprises adding to said whiskey, in a precipitating amount, a polyvinylimidazole having a molecular weight ranging from 20,000 to 400,000 and removing the precipitate from the whiskey.

6. The process for precipitation of protein-tannin complexes from beer which comprises adding to said beer, in a precipitating amount, a polyvinylimidazole having a molecular weight ranging from 20,000 to 400,000 and removing the precipitate from the beer.

References Cited in the file of this patent

UNITED STATES PATENTS

| | | |
|---|---|---|
| 2,688,550 | McFarlane | Sept. 7, 1954 |
| 2,811,449 | Witwer et al. | Oct. 29, 1957 |